United States Patent [19]

Scobey et al.

[11] Patent Number: 4,969,716

[45] Date of Patent: Nov. 13, 1990

[54] SOLDER SEALED BANDPASS FILTER AND METHOD OF MAKING

[75] Inventors: Michael A. Scobey, Santa Rosa; Robert S. Lipsky, Sebastopol, both of Calif.

[73] Assignee: Optical Coating Laboratory, Inc., Santa Rosa, Calif.

[21] Appl. No.: 334,236

[22] Filed: Apr. 3, 1989

[51] Int. Cl.$^5$ ............................ G02B 5/20; G02B 5/24
[52] U.S. Cl. ........................................ 350/311; 350/1.7
[58] Field of Search ............... 350/319, 320, 589, 590, 350/1.7; 156/104, 107; 252/582; 427/162–169

[56] References Cited

U.S. PATENT DOCUMENTS 3,709,765  1/1973  Miles .................................... 350/311

OTHER PUBLICATIONS

Brunsting et al, "Environmental Effects on All–Dielectric Bandpass Filters", Applied Optics, vol. 25, No. 18, Sep. 15, 1986, p. 3235.
Photonics Products Catalogue, 10/87, p. 124.

Primary Examiner—Bruce Y. Arnold
Assistant Examiner—James Phan
Attorney, Agent, or Firm—Philip A. Dalton

[57] ABSTRACT

The fabrication and structure of a hermetically sealed, environmentally-sensitive, thin film coating between two planar transmitting substrates is disclosed. The edges of the substrates are metallized to allow solder to wet and form a vapor barrier. Two such substrates are assembled with an O-ring spacer or an epoxy/glue spacer and the assembly is then soldered to a protective ring using a benign low temperature indium based solder. Fluxes from the soldering step are separated from the coating by the O-ring spacer, which also acts as an aperture stop.

10 Claims, 2 Drawing Sheets

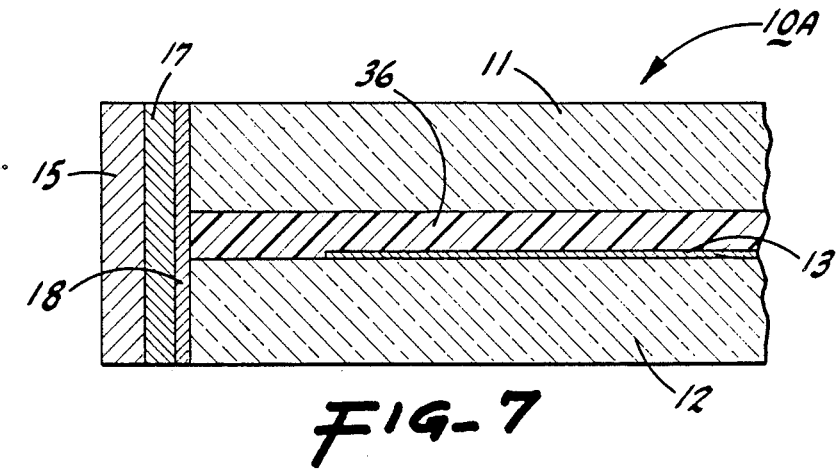
FIG-7
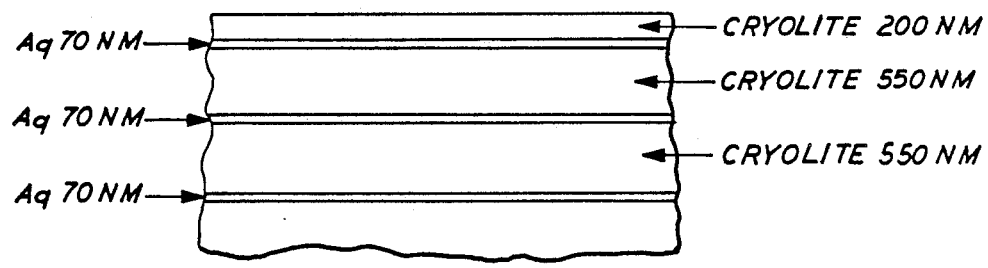
FIG-4
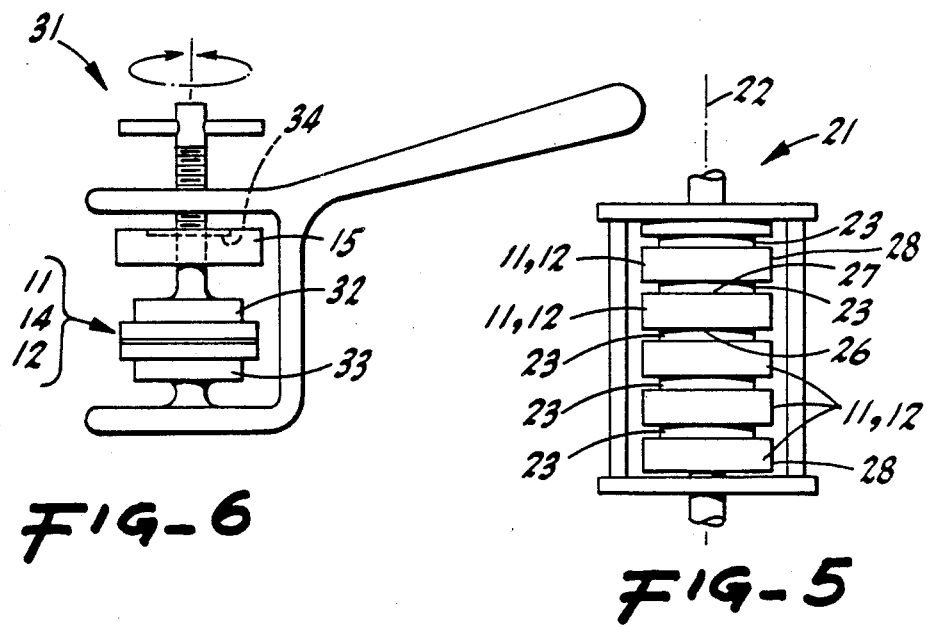
FIG-6
FIG-5

SOLDER SEALED BANDPASS FILTER AND METHOD OF MAKING

BACKGROUND OF THE INVENTION

The present invention relates to the formation and structure of hermetically sealed metal and dielectric thin film optical structures, and in general to structures which include environmentally sensitive thin film coatings of material such as silver and to applications such as metal and dielectric optical bandpass filters.

Metal and dielectric thin film optical coatings are employed in numerous bandpass filter applications, needing high attenuation as well as good transmission and narrow bandwidths. A typical application is medical instruments, such as glucometers, that use the filters to measure the optical properties of a sample at a discrete wavelength.

Unfortunately, unprotected thin films of most metals, in particular silver, will decompose physically and/or suffer deterioration or loss of the desired spectral characteristics, due to humidity-induced tarnishing or oxidation.

In the past, most efforts to hermetically seal thin films have centered on depositing a durable thin film overcoat, epoxying covers on the films, or mechanically sealing the films using organic barriers. These solutions at best provide short term environmental barriers because of the high porosity of glues and organic materials and the short humidity path length of the thin overcoat layers.

To our knowledge, previously solder sealed encapsulation techniques have not been applied to metal-dielectric thin film technology because the films are subject to physical and optical deterioration at the temperatures used by low temperature solders and are attacked by common solder and solder flux materials.

SUMMARY OF THE INVENTION

Objects

As is implicit in the above discussion, it is one object of the present invention to provide a solder joining technique for securely and reproducibly hermetically sealing environmentally sensitive thin film optical coatings against moisture.

It is another object of this invention to provide just such a technique which does not itself degrade the optical or physical integrity of the coating.

It is a specific object of this invention to provide a technique for hermetically sealing silver-containing optical coatings which satisfies all of the above objectives.

SUMMARY

In one aspect the present invention relates to a method for forming and hermetically encapsulating a silver optical coating, which comprises:
providing a pair of flat glass substrates and forming a solderable metallic pad along the edge thereof;
forming an optical coating on a major surface of at least one of said substrates;
providing a plastic O-ring and a solderable ring;
selectively coating the solderable ring and the solder pads and the outside of the O-ring with flux; and
wetting the fluxed areas with heated solder and clamping together the substrates with the O-ring therebetween and the optical-coated surface facing inwardly and the solderable ring peripherally over the O-ring and substrates.

In another aspect, the O-ring and substrates are assembled together prior to the fluxing step and the soldering step to facilitate selectively coating the O-ring and substrates with flux and solder.

In still another aspect, the present invention relates to a hermetically-sealed, silver-containing optical filter coating, comprising: a pair of glass substrates spaced apart by an O-ring located at the peripheral inner edges of the substrates, at least one of the substrates having an optical filter coating formed on the inner facing major surface thereof, said glass substrates having thin coatings of vacuum-deposited solderable material on the peripheral edges thereof; and a ring having the inner surface thereof hermetically joined to said edges by solder.

ADVANTAGES

The above solder encapsulation process and structure overcome and avoid the problems and the resultant short term protection of the glued covers, organic barriers and overcoats as well as the problems attendant to the encapsulation of glass substrates and the attack and degradation of delicate thin films when solder joints are used.

Specifically and according to the present invention, the delicate thin film optical coatings are separated from the solder and the flux by the O-ring barrier. The application of the metallization to the edge of the glass substrate and the use of a solderable assembly ring permit joining using dense metallic solder and encapsulation of the moisture-protected thin film between the two impervious substrates and the ring. To enter this sealed film assembly, moisture must travel along the relatively long path, designated 30 in FIG. 2, along the substrate-metallic interface. Path 30 is many millimeters long. Hence, pinhole and defect-free solder pads are not required.

Films protected in such a manner have survived with no degradation after 90 days in a humidity chamber at 95% relative humidity and 55° C. and likely will survive normal room temperatures and humidity indefinitely.

There are considerable advantages in using an assembly ring which is soldered to the edge of the substrates. A large proportion (typically greater than 90%) of the cross-section aperture is usable bandpass filter area. Also, the O-ring spacer acts as a protection device, preventing chipping of the solder, substrate and film. Finally, but not exhaustively, the O-ring spacer slightly overlaps the thin film coating and accurately delineates the usable coating area to act as an aperture stop, preventing unwanted light from entering and being transmitted through the system.

In short, delicate thin film coatings are protected against moisture during use by hermetically soldering sealing the coatings between two high transmittance substrates without damaging the films during the encapsulation process.

BRIEF DESCRIPTION OF THE DRAWINGS

The above and other aspects of our present invention are described with respect to the drawings in which:

FIG. is a perspective representation of a hermetically-encapsulated, solder-sealed optical bandpass filter which incorporates the principles of our present invention;

FIG. 4 schematically illustrates a design for a silver-cryolite bandpass filter suitable for use in the solder-encapsulated thin film bandpass filter construction of FIG. 1;

FIG. 5 depicts a rotatable cage arrangement for holding and masking a plurality of substrates in a vacuum sputtering chamber of the type described in commonly assigned co-pending U.S. application Ser. No. 154,177;

FIG. 6 depicts a clamp suitable for dipping the assembled solder-encapsulated thin-film bandpass filter of FIG. 1 into a solder bath; and FIG. 7 depicts an alternative embodiment of the solder-sealed, hermetically-encapsulated bandpass filter which also incorporates principles of the present invention.

DETAILED DESCRIPTION OF THE PREFERRED EMBODIMENT(S)

Figure 1:
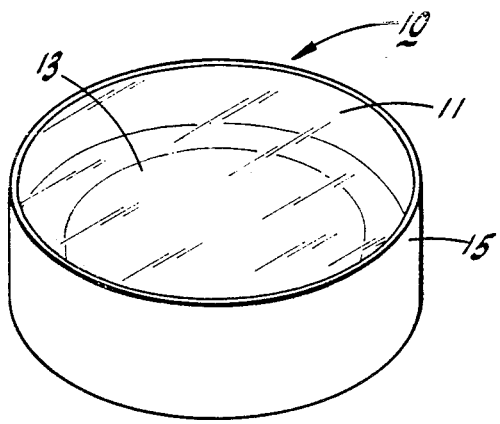
Figure 2:
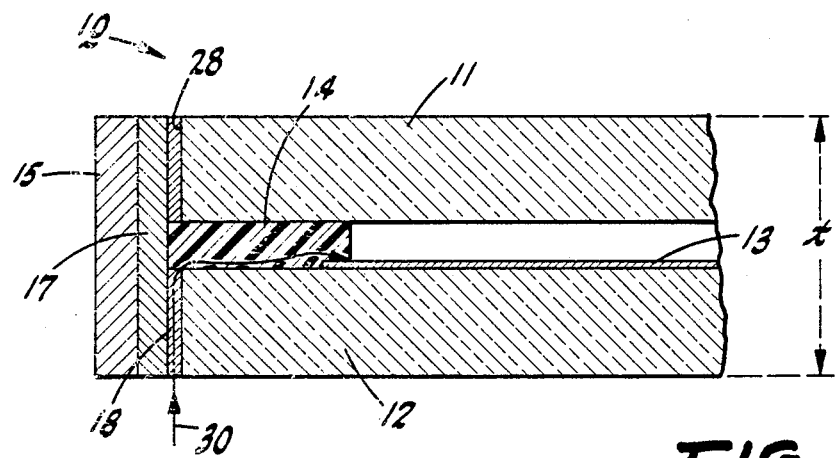
FIG. 2 is a partial, vertical sectional view of the filter of FIG. 1.
Figure 3:
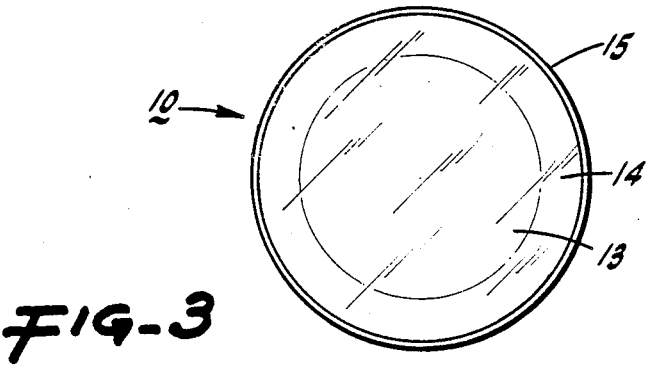
FIG. 3 is a top plan view of the filter of FIG. 1.

FIGS. 1–3 depict, respectively, perspective, partial vertical section and top plan views of a solder-sealed hermetically-encapsulated, thin film bandpass filter 10, the structure and formation of which are according to the present invention. More generally the formation and structure of device 10 represent application of the present invention to provide hermetically-sealed solder encapsulation of optically useful but environmentally sensitive thin film materials, such as metals, which are degraded by moisture and humidity and even to delicate materials such as silver which, in addition, are physically and/or optically degraded by the temperatures and materials used for conventional solder sealing.

Referring further to FIGS. 1–3 and in particular to FIG. 2, the solder-sealed, hermetically encapsulated thin film bandpass filter device 10 (hereafter bandpass filter device 10) comprises a pair of glass substrates 11 and 12; a thin film bandpass filter coating 13 formed on one of the substrates, illustratively, the substrate 12 depicted in the bottom position in FIG. 2; a protective 0-ring spacer 14, typically formed of inert, benign relatively high melting point plastic material such as Teflon ®; and a protective retaining ring 15 of solderable material with the thermal expansion matched to the substrate, which is joined by solder to the substrate-0 ring-substrate composite, to thereby provide support as well as to hermetically seal the assembled device 10 against humidity. A hermetic seal is made possible between the solder 17 and the edges of the substrates 11 and 12 by rings or pads 18 of solderable metal (metallization). Typically, the pads 18 are formed along the edges of the substrate using standard vacuum deposition techniques. In short, the solder-sealed bandpass filter assembly 10 comprises essentially four sealing components in addition to the solder seal: the two metallized glass substrates 11 and 12, the Teflon ® 0-ring spacer 14 and the protective ring 15 which is soldered to the outer edge of the substrates and to the 0-ring.

The fabrication and assembly process which makes possible the above-identified structure is as follows.

EDGE METALLIZATION PAD

A vacuum deposition process is used to form the ring 18 of solderable (solder wettable) metal around the edge of both substrates 11 and 12. Any of a number of standard vacuum deposition processes can be used to form the pads 18. Alternatives include coating the edges with bakeable metallic paint and baking the paint, in vacuum or typically at atmospheric pressure.

Presently, we prefer to use the magnetron-enhanced vacuum sputter chamber and process disclosed in commonly assigned, co-pending U.S. Pat. application Ser. No. 154,177, entitled "MAGNETRON SPUTTERING APPARATUS AND PROCESS", filed Feb. 8, 1988, now U.S. Pat. No. 4,851,095, issued July 25, 1989, which patent is hereby incorporated by reference in its entirety. The referenced vacuum deposition patent application incorporates a planetary gear arrangement which is used to mount curved workpieces such as the substrates 11 and 12 about a planet gear axis which rotates about a sun axis (the workpiece rotates simultaneously about both the planet axis and the sun axis) and past single or multiple sputter deposition stations or sputter deposition and oxidation stations to thereby provide single or multiple layer coatings of precisely controlled thickness. A cage 21 shown in FIG. 5 can be used to mount and mask a plurality of the substrates 11 and 12 for rotation about the planetary rotational axis 22. Each substrate is supported on opposite sides by spacers 23 which completely mask the major surfaces 26 and 27 of the substrate 11 or 12. Thus, double rotation sputter deposition operation of the referenced system forms a solderable metal pad 18, FIG. 2, of precisely controlled thickness which covers the edge 28. As an example the edge metallization can be copper or brass formed to a thickness of about 2 microns.

OPTICAL COATING

The optical thin film coating 13 is formed on the substrate 12, again using conventional processing. (Please note, while the invention is uniquely applicable to sealing films and coatings 13 which are very environmentally sensitive, it is applicable as well to any presently known or future suitable films and coatings.) One example of a presently preferred blood glucose measurement, bandpass film 13 is depicted schematically in FIG. 4. Exemplary film 13 is centered in the green portion of the visible light spectrum at 550 nanometers (nm). As indicated the film 13 comprises the design:

substrate/Ag/cryolite/Ag/cryolite/Ag/cryolite/air
30    550    70    550    30    200 nm.

The design of this metal dielectric filter is slightly different from conventional two-cavity bandpass films in that it includes a thin cryolite overcoat which acts as an encapsulation layer to protect the outside silver layer from tarnishing during the high temperature (150° C.) soldering process, yet has a negligible effect on spectral performance.

FLUX

In the present manual technique, in the next, third step of the process sequence, the copper ring 15, Teflon ® spacer 14 and the two edge metallized glass substrates 11 and 12 are cleaned and temporarily assembled. Typically, the filter is assembled by placing the copper ring 15 on a clean, level surface, then the uncoated protective-barrier substrate 11 is inserted inside the ring, the Teflon ® 0-ring spacer 14 is inserted and finally the silver coated substrate 12 is placed on top, coating face down. Next, the assembly is placed in clamp 31 shown in FIG. 6 and screw-type clamping member 32 is tightened to secure the substrates to the spacer between member 32 and stationary member 33. The copper ring 15, which slides freely over the substrates, is lifted above the substrates and supported on horizontal clamp or pin 34, uncovering the exposed metallized glass edges. The metal pads 18 on the peripheral edges 28 along with the inside and outside of the copper ring 15 are then coated with suitable flux such as Indium Corp 5RMA flux, e.g., by dipping the assembly into a flux pot, or brushing the flux on the soldering surfaces.

SOLDER SURFACES APPLICATION AND FINAL ASSEMBLY

Solerable pads or ring 18 and the copper ring 15 are wetted, the parts are dipped in a solder pot (still using tool 31) and while immersed in solder the copper ring 15 is slid off the retainer 34 and onto the assembled filter, and thereafter the copper ring is jiggled or rotated while immersed to remove any air bubbles and ensure the ring is pushed far enough down to cover the entire edge of the assembly. Typically, we use a dense metallic solder, preferably a benign low temperature indium based solder such as 97/3 by weight In/Ag solder. The solder is heated to a temperature of between 150-175° C.

If, after dipping, any gaps are evident in the solder coating, the exposed area is refluxed and redipped.

Finally, the parts are removed from the solder pot, allowed to cool, then excess flux is removed and the part is cleaned with alcohol and acetone and excess solder is trimmed from the edges and the copper ring is painted.

FIG. 7 depicts an alternative embodiment of our solder-sealed, hermetically-encapsulated thin film bandpass filter device 10A in which the 0-ring spacer 14 is not used. The 0-ring spacer 14 is replaced by optical quality epoxy or glue spacer 36, which provides the desired substrate-to-substrate spacing and enhances hermetic isolation of the thin film 13.

EXAMPLE

The following are dimensions for a typical solder-sealed filter employing two glass substrates 0.25 in. thick having a diameter of 1.225 in.: substrates 0.25 in. thick, 1.225 in. diameter; Teflon ® 0-ring spacer 0.005 in. thick, 1.175 in. I.D.; 1.225 in. O.D.; copper protective ring 1.235 in. I.D.; 1.300 in. O.D..

It should be noted that these dimensions are given by way of illustration only and only for the particular assembly materials and components. Those of usual skill in the art will readily determine the associated dimensions for other assemblies which use substrates of different thickness and diameter, to satisfy the applicable quality control specifications While preferred and alternative embodiments of our invention have been disclosed along with the current and best mode of practicing the invention and the design considerations which will enable those of skill in the art to readily arrive at the best mode of future equivalents, it is to be understood that such equivalents are considered within the scope of the present invention and the following claims.

What is claimed is:

1. A method for forming and hermetically encapsulating an optical coating, comprising:
   providing a pair of glass substrates, a solderable metallic ring and a spacer selected from a group consisting of an O-ring member, optical quality epoxy and optical quality glue;
   forming a solderable metal coating on the edges of the substrates;
   forming an optical coating on a major surface of at least one of said substrates;
   assembling the edge-coated substrates with the spacer therebetween and the coated major surface facing inwardly and wetting the inside of the solderable metallic ring and the outside of the spacer and the metallized edges of the substrates with flux; and
   dipping the assembly into a solder bath to seal the substrates to the metallic ring.

2. The method of claim 1, wherein the solder is indium/silver.

3. The method of claim 1, wherein indium/silver solder is used comprising by weight 97%/3% In/Ag.

4. The method of claim 1, 2 or 3, wherein the solderable substrate edge metallization comprises nickel-copper alloy.

5. The method of claim 4, wherein the edge metallization is formed by vacuum deposition.

6. The method of claim 1, wherein the optical coating is a silver-containing bandpass filter coating.

7. A hermetically-sealed, silver-containing optical filter coating, comprising:
   a pair of glass substrates spaced apart by an O-ring spacer located at the peripheral inner edges of said substrates, at least one of the substrates having a silver-containing optical filter coating formed on the inner facing major surface thereof, said glass substrates having thin coatings of solderable material on the peripheral edges thereof; and
   a ring having the inner surface thereof hermetically joined to said thin coatings by solder.

8. A hermetically-sealed, silver-containing optical filter coating, comprising:
   a pair of glass substrates spaced apart by an adhesive spacer located at the peripheral inner edges of said substrates, at least one of the substrates having a silver-containing optical filter coating formed on the inner facing major surface thereof, said glass substrates having thin coatings of solderable material on the peripheral edges thereof; and
   a ring having the inner surface thereof hermetically joined to said thin coatings by solder.

9. The hermetically-sealed optical filter assembly of claim 7 or 8, wherein the edge metallization comprises nickel-copper alloy and the solder is indium/silver material and the joined ring is selected from copper and brass.

10. A method or supporting and hermetically sealing an optical coating, comprising:
    providing a pair of glass substrates and forming a solderable metallic pad along the edges thereof;
    forming an optical coating on a major surface of at least one of said substrates;
    assembling together the substrates with spacer means therebetween and the optical-coated surface facing inwardly; and
    providing a solderable metallic ring and coating the solderable metallic pads and the inside of the solderable metallic ring with flux, then wetting the previously fluxed areas with heated solder and assembling the metallic ring over the assembled spacer means and substrate.

* * * * *